L. J. COBUS.
STEERING WHEEL HEATER.
APPLICATION FILED JULY 9, 1920.
1,416,946.
Patented May 23, 1922.
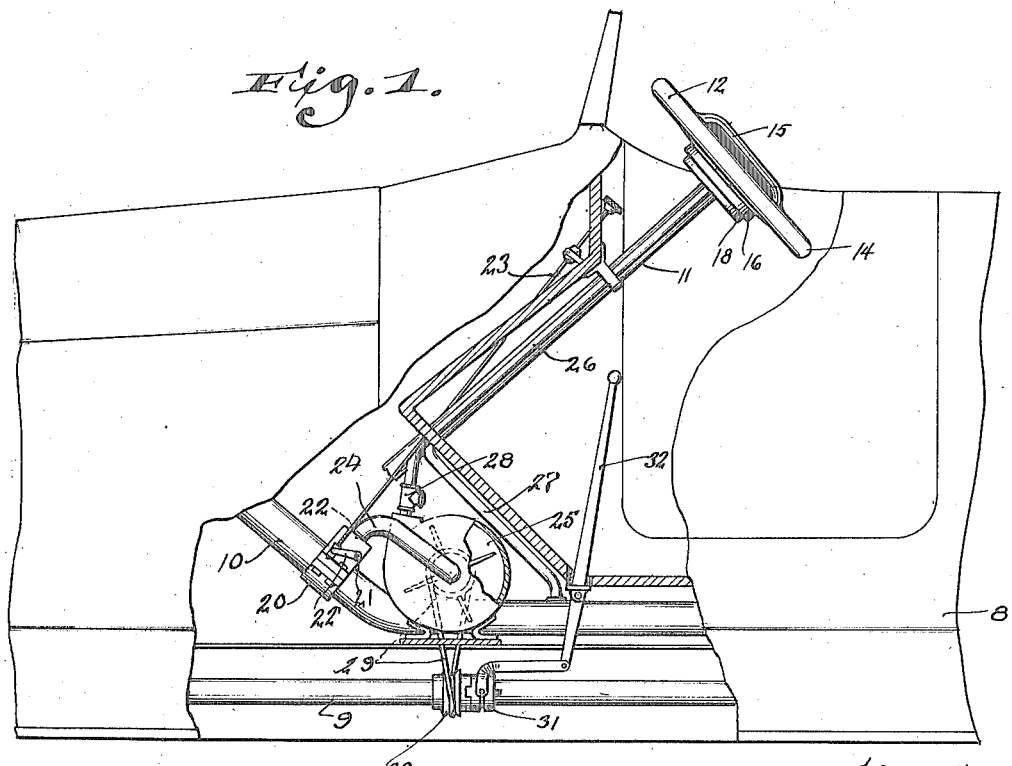
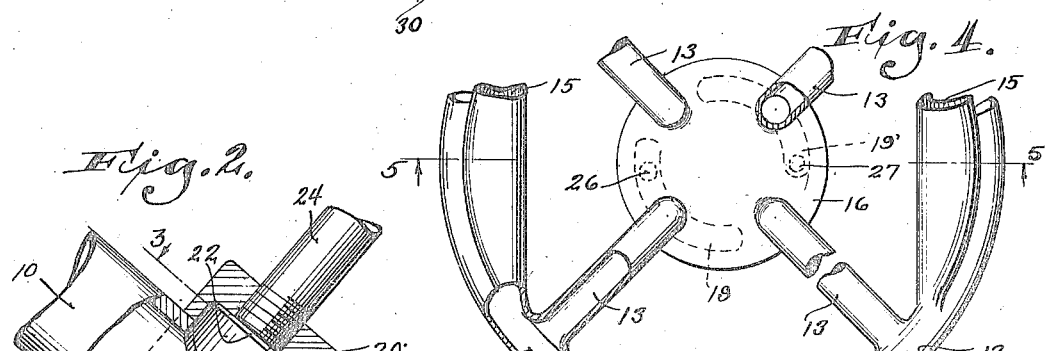
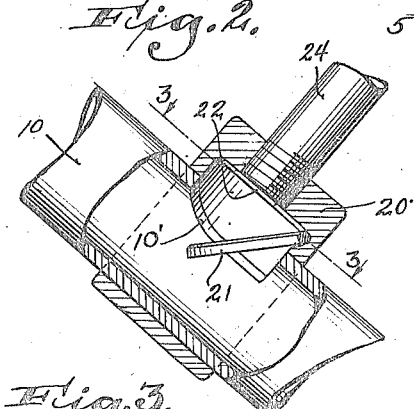
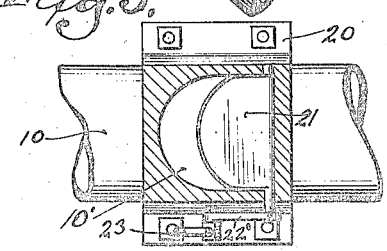
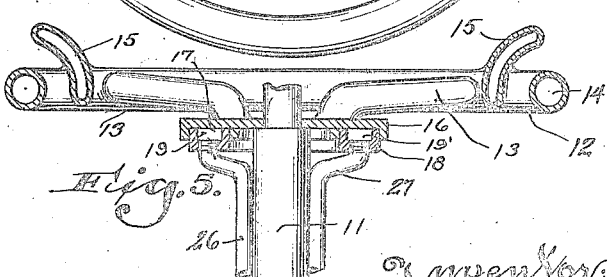

UNITED STATES PATENT OFFICE.

LAWRENCE J. COBUS, OF MILWAUKEE, WISCONSIN.

STEERING-WHEEL HEATER.

1,416,946.    Specification of Letters Patent.    Patented May 23, 1922.

Application filed July 9, 1920. Serial No. 394,976.

*To all whom it may concern:*

Be it known that I, LAWRENCE J. COBUS, a citizen of the United States, and resident of Milwaukee, in the county of Milwaukee and State of Wisconsin, have invented new and useful Improvements in Steering-Wheel Heaters, of which the following is a description, reference being had to the accompanying drawings, which are a part of this specification.

This invention relates to improvements in steering wheel heaters more particularly although not solely adapted for automobile use. Many serious accidents result in the operations of vehicles under cold climatic conditions, on account of the operator's hands, which are in a more or less inactive position on the steering wheel, becoming benumbed by the cold. Many attempts have been made to obviate this difficulty and render it safe to operate vehicles in cold and inclement weather with various degrees of success; and it is the primary object of the present invention to provide a positive method of heating the steering wheels of various types which will overcome the disadvantages of others and permit the safe operation of the steering wheel.

It is one of the objects of the present invention to provide a steering wheel heater having novel features of construction whereby the exhaust gases from the engine are caused to positively circulate through the spokes and rim of the steering wheel of a motor vehicle, motor boat or aeroplane for warming the same so that the hands of the driver will be kept warm while operating the machine.

A further object of the invention is to provide a steering wheel heater in which a heating means is provided for warming outer portions of the fingers of the driver while holding the steering wheel.

A further object of the invention is to provide a steering wheel heater which may be easily mounted upon the steering column of the ordinary steering mechanism without interfering in any manner with the steering function.

A further object of the invention is to provide a steering wheel heater having means for easily controlling the flow of the hot exhaust gases through the steering hand wheel.

A further object of the invention is to provide a steering wheel heater which is of simple construction, is strong and durable and is well adapted for the purpose described.

With the above and other objects in view the invention consists of the improved steering wheel and its parts and combinations as set forth in the claims, and all equivalents thereof.

In the accompanying drawing in which the same reference characters indicate the same parts in all of the views:

Fig. 1 is a side view of a portion of an automobile provided with the improved steering wheel heater, parts being broken away and in section to show interior construction;

Fig. 2 is a sectional detail view of the valve controlling the flow of the exhaust gases to the steering wheel;

Fig. 3 is a sectional view taken on line 3—3 of Fig. 2;

Fig. 4 is a top fragmentary view of the steering wheel shown partly in section; and Fig. 5 is a vertical sectional view taken on line 5—5 of Fig. 4.

Referring to the drawing the numeral 8 indicates an automobile body, 9 the driving shaft, 10 the exhaust pipe from the engine and 11 the steering column for controlling the direction of travel of the vehicle. The steering wheel 12 mounted upon the upper end portion of the column 11 in the ordinary manner is formed with tubular spokes 13, a tubular rim 14 and opposite supplemental tubular heating members 15 which are spaced from the inner and upper portions of the rim, and in cross section are curved concentrically with relation to said rim. The bores of the supplemental members are in communication with the rim, and the rim bore is in communication with the spokes and the bores of the inner ends of the spokes are curved downwardly and extend through the hub portion 16 of the steering wheel.

The hub portion 16 is formed with an annular channel or recess 17 in its under side into which extends and closely, but rotatably, fits the upper portion of a channeled ring 18. The top wall of said ring is provided with opposed arcuate slots 19 and 19' with each of which the bore of one spoke 13 registers at all times whereby the heating medium, supplied by the means hereinafter described, may be circulated through the steering wheel.

A split pipe coupling 20 surrounds the exhaust pipe at an opening 10' therein and is provided with a hinged valve 21 which opens downwardly into the pipe through said opening in a direction to intercept the flow of hot gases and deflect them outwardly through the discharge opening 22 of the coupling. The valve 21 is controlled by suitable means (not shown) preferably located at the vehicle dash by a controlling rod 23 connected with an arm 22' secured to the pivot stem of valve 21. A pipe 24 extends from the coupling discharge opening 22 to the intake opening of a rotary fan 25, preferably mounted adjacent the exhaust pipe, which fan prevents retardation of the flow of exhaust gases and insures the positive circulation of the gases through the steering wheel.

A pipe 26 connected to the discharge opening of the fan extends upwardly on one side of the steering post 11 and is connected to the annular rim 18 mounted on the upper end of said steering post and is in communication with the part annular recess 19. A discharge pipe 27 connected at its upper end to the recessed portion 19' of the rim 18 extends downwardly therefrom on the opposite side of the steering post and is connected to the exhaust pipe 10 at the rear of the coupling 20 so that the exhaust gases after passing through the steering wheel will be returned to the exhaust pipe. The pipe 26 is provided with a T-coupling 28 for connecting other heating coils thereto when desired.

The fan has a belt and pulley connection 29 with a pulley 30 loosely mounted on the drive shaft 9 and is driven thereby. A clutch 31 splined on the drive shaft 9 is controlled by a lever 32 which extends within reach of the operator.

The members 15 form shields overlying the portion of the rim 14 which is used as a hand grip by the operator, which shield has a dual use, one, that of shielding or protecting the driver's hands from the elements as well as keeping them warm, and the other forming a protector when the heating feature is not in use to permit a more firm grasping or holding of the steering wheel. While in the accompanying drawings, the use of the shield 15 has been illustrated only in connection with an automobile steering wheel, it will be readily appreciated that the same is adaptable in connection with any kind of a steering member such as an aeroplane "joy-stick."

From the foregoing description it will be seen that the hot exhaust gases from the engine are positively forced through the tubular steering wheel and will warm the same so that the supplemental tubular heating portions 15 of the wheel will protect and warm the back portions of the hands of the driver and permit driving in comfort in the coldest weather.

What I claim as my invention is:

1. A controlling member comprising a rim, a pair of opposed, tubular hand grip portions carried by the rim, means connecting the bores of said hand grip portions, a hub plate having a peripheral down-struck flange, a pair of tubular spokes connecting said rim and hub plate, the bores of said spokes communicating one with the interior of each hand grip portion and with the under face of the hub plate, an annular member having its upper face engaging the under face of said hub plate and its sides engaging the inner periphery of said hub plate flange, said annular member having two opposed, arcuate recesses in its upper face registering one with the bore of each spoke, means for supplying a fluid to one of said recesses, a fluid exhaust pipe connected with the other recess, and circulating means connected with the fluid supply means for circulating the fluid through said tubular hand grip portions.

2. A controlling member heating means, comprising a steering wheel having a tubular rim and spokes, the bores of the spokes extending through the hub of the wheel, supplemental tubular heating members spaced from portions of the rim and in communication with said bores, an annular member having recesses in communication with the hub bores, an exhaust pipe, a fan, a tubular connection between the exhaust pipe and the fan and between the fan and one of the recesses of the annular member, a valve controlling the flow of hot gases through the tubular connection, a tube connected to another recess of the annular member and extending downwardly therefrom, and means for rotating the fan.

3. A device of the character described comprising a controlling member, inlet and outlet pipes connected to the controlling member, a fan having an intake and an outlet leading therefrom, a valve controlled passage connecting the fan intake with the exhaust of the engine in connection with which the device is employed, and a tube connecting the fan outlet with said inlet pipe, whereby the engine exhaust gases will be rapidly circulated through the controlling member.

In testimony whereof, I affix my signature.

LAWRENCE J. COBUS.